United States Patent [19]
Bagnell et al.

[11] Patent Number: 5,796,557
[45] Date of Patent: Aug. 18, 1998

[54] DISK DRIVE ARCHITECTURE INCLUDING A CURRENT-INDUCED LATCHING DEVICE

[75] Inventors: Glade N. Bagnell, Longmont; William F. Repphun, Boulder, both of Colo.

[73] Assignee: Seagate Technology, Inc., Scotts Valley, Calif.

[21] Appl. No.: 567,859

[22] Filed: Dec. 6, 1995

Related U.S. Application Data

[63] Continuation of Ser. No. 77,708, Jun. 15, 1993, abandoned, which is a continuation of Ser. No. 612,427, Nov. 9, 1990, abandoned.

[51] Int. Cl.$^6$ .................................. G11B 5/54; G11B 21/22
[52] U.S. Cl. .................... 360/105; 360/98.01; 360/97.03
[58] Field of Search ............................ 360/97.01–97.03, 360/98.01, 105, 106, 78.08–78.14, 903

[56] References Cited

U.S. PATENT DOCUMENTS

| | | | |
|---|---|---|---|
| 4,638,383 | 1/1987 | McGinlay et al. | 360/78.08 |
| 4,669,004 | 5/1987 | Moon | 360/78.14 |
| 4,881,139 | 11/1989 | Hazebrouck | 360/105 |

(List continued on next page.)

FOREIGN PATENT DOCUMENTS

| | | |
|---|---|---|
| 0 427 490 A2 | 5/1991 | European Pat. Off. |
| WO 89/08313 | 9/1989 | WIPO |

OTHER PUBLICATIONS

Patent Abstracts of Japan, P1102, vol. 14, No. 415, 02–158982, Sep. 7, 1990.
Patent Abstracts of Japan, E150, vol. 3, No. 135, 54–113312, Nov. 10, 1979.
"Focus on High–Capacity Winchester Disk Drives", Stephen Ohr, 2328 Electronic Design, 33, Sep. 1985, No. 22, Hasbrouck Heights, New Jersey, pp. 209–212, 214, and 216.
"Laptop Hard Disk Drive Specs Require Design Optimization Today", Dr. Kai Sun, Computer Technology Review, Spring (1990), pp. 49–50 and 52–53.
"Characteristics of Heat Transfer in Small Disk Enclosures at High Rotation Speeds", Isamu Sato, et al., 8091 IEEE Transactions on Components, Hybrids, and Manufacturing Technology, 13, Dec. 1990, No. 4, New York, pp. 1006–1011.
"High–Capacity 3–½ In. Hard–Disk Drives", Maury Wright, 2119 EDN—Electrical Design News 36, Feb. 4, 1991, No. 3, Newton, MA, pp. 73–78 and 80.

*Primary Examiner*—Craig A. Renner
*Attorney, Agent, or Firm*—Fliesler, Dubb, Meyer & Lovejoy, LLP

[57] ABSTRACT

A half-height, 3½-inch form factor disk drive architecture. The architecture includes at least six storage disks for storing data and a plurality of interactive read/write heads, two per disk, for reading information from and writing information on the storage disks. An actuator assembly, responsive to control signals, for selectively positioning the read/write heads with respect to the storage disks, and a latching mechanism are also included. Control electronics are provided on a printed circuit board to generate control signals to control the actuator means, and to provide information signals to and receive information signals from the read/write heads. The architecture also includes a housing defining the maximum height, length, and width of the disk drive, the housing having a maximum height of approximately one and $^{65}/_{100}$ ths inches (1.65"), and including: a base having a first side and a second side, the base for supporting the storage disks about a first support post, the base supporting the actuator assembly about a second support post; a cover secured to the first and second support posts and sealably attached to the top of the base to enclose the storage disks, the interactive read/write heads, and the actuator assembly; and a shock frame, having a first and second sides mounted adjacent the first and second sides of the base, the shock frame secured to the cover.

23 Claims, 7 Drawing Sheets

U.S. PATENT DOCUMENTS

| | | | |
|---|---|---|---|
| 4,933,785 | 6/1990 | Morehouse et al. | 360/137 X |
| 4,965,684 | 10/1990 | Stefansky | 360/78.12 |
| 4,979,062 | 12/1990 | Stefansky et al. | 360/97.02 |
| 4,989,108 | 1/1991 | Chang | 360/105 |
| 5,027,241 | 6/1991 | Hatch et al. | 360/105 |
| 5,027,242 | 6/1991 | Nishida et al. | 360/105 |
| 5,034,837 | 7/1991 | Schmitz | 360/105 |
| 5,038,239 | 8/1991 | Vettel et al. | 360/98.01 |
| 5,081,552 | 1/1992 | Glaser et al. | 360/98.01 |
| 5,170,300 | 12/1992 | Stefansky | 360/105 |

DISK DRIVE ARCHITECTURE INCLUDING A CURRENT-INDUCED LATCHING DEVICE

This application is a file wrapper continuation of Ser. No. 08/077,708, filed Jun. 15, 1993, now abandoned, which is a continuation of Ser. No. 07/612,427, filed Nov. 9, 1990, now abandoned.

CROSS-REFERENCE TO RELATED APPLICATIONS

"Disk Drive System Using Multiple Embedded Quadrature Servo Fields," Ser. No. 08/083,192, filed Jun. 23, 1993, U.S. Pat. No. 5,381,281, issued Jan. 10, 1995, assigned to the assignee of the present application, which is a file wrapper continuation of Ser. No. 07/860,299, filed Mar. 27, 1992, now abandoned, which is a file wrapper continuation of Ser. No. 07/780,443, filed Oct. 17, 1991, now abandoned, which is a file wrapper continuation of Ser. No. 07/386,504, filed Jul. 27, 1989, now abandoned.

"Low Height Disk Drive," Ser. No. 07/147,804, filed Jan. 25, 1988, U.S. Pat. No. 4,965,684, issued Oct. 23, 1990, assigned to the assignee of the present application. "Disk Drive System Control Architecture," Ser. No. 07/057,289, filed Jun. 2, 1987, U.S. Pat. No. 4,979,056, issued Dec. 18, 1990, assigned to the assignee of the present application.

"Programmable Microcontroller," Ser. No. 08/062,737, filed May 14, 1993, assigned to the assignee of the present application, which is a file wrapper continuation of Ser. No. 07/790,008, filed Nov. 4, 1991, now abandoned, which is a continuation of Ser. No. 07/488,386, filed Feb. 23, 1990, now abandoned, which is a continuation of Ser. No. 07/057,806, originally entitled "Disk Drive Software System Architecture" filed Jun. 2, 1987, now abandoned.

"Signal Processing System Including Adaptive Read Equalizer With Shut Off Mode For Disk Drives," Ser. No. 08/201,720, filed Feb. 25, 1994, assigned to the assignee of the present application, which is a file wrapper continuation of Ser. No. 08/058,050, filed May 5, 1993, now abandoned, which is a file wrapper continuation of Ser. No. 07/954,690, filed Sep. 30, 1992, now abandoned, which is a continuation of Ser. No. 07/559,899, originally entitled "Adaptive Read Equalizer With Shut-Off Mode For Disk Drives" filed Jul. 30, 1990, now abandoned.

"Disk Drive System Employing Adaptive Read/Write Channel Controls and Method of Using Same," Ser. No. 07/784,655, filed Oct. 28, 1991, U.S. Pat. No. 5,121,262, issued Jun. 9, 1992, assigned to the assignee of the present application, which is a continuation of Ser. No. 07/420,371, filed May 23, 1989, now abandoned.

"Multiple Actuator Disk Drive," Ser. No. 07/614,853, filed Nov. 13, 1990, U.S. Pat. No. 5,293,282, issued Mar. 8, 1994, assigned to the assignee of the present application, which is a continuation-in-part of Ser. No. 07/431,575, filed Nov. 3, 1989, U.S. Pat. No. 5,223,993, issued Jun. 29, 1993, assigned to the assignee of the present application.

Each of these related applications is hereby incorporated by reference.

BACKGROUND OF THE INVENTION

1. Field of the Invention

The present invention relates to disk drives; more particularly, to disk drives which have increased storage capacity and reduced size, weight, and power consumption.

2. Description of the Related Art

Conventional disk drives for use in work stations, personal computers, portable computers, and lap top computers, are required to provide a large amount of data storage within a minimum physical space. Such disk drives often incorporate a plurality of disks organized in a stack, and a plurality of heads associated with corresponding disk surfaces. In general, one read/write head or transducer is utilized per disk surface. Each head is positioned over respective tracks on the disk by actuators coupled to control electronics which control the positioning of the actuator and the read/write functions of the heads. In general, one read/write head or transducer is utilized per disk surface. Each head is positioned over respective tracks on the disk by actuators coupled to control electronics which control the respective positioning of the actuator and the read/write functions of the heads.

Greater demands are being placed on disk drives by (1) the use of multi-user and/or multi-tasking operating systems, (2) work stations which provide an operating environment requiring the transfer of large amounts of data to and from a hard disk and/or large numbers of disk accesses to support large application programs or multiple users, and (3) the continuing trend toward higher performance microprocessors. All such systems require high-capacity storage capability, while maintaining a minimum of physical space per megabyte of storage.

To satisfy these demands, it has become desirable to increase the performance of hard disk drives to ever greater performance levels and ever larger capacities. For such applications, single drive capacities on the order of hundreds of megabytes are common. And, due to the desire on the part of many hardware manufacturers to build their hardware components into ever decreasing dimensions, the amount of storage capacity per square inch is also on the increase.

One performance benchmark includes the drive access time, conventionally known as the average seek time determined by dividing the total time required to seek between all possible ordered pairs of track addressed by the total number of ordered pairs addressed. Other performance benchmarks include the data transfer rate, (both to and from the media,) the overhead imposed by the electronics of the disk drive, and the average latency time.

A number of problems arise in attempting to increase the amount of storage capacity per area in a disk drive utilizing Winchester storage technology. For example, the read/write heads are designed to function at a specific height above the storage disk, for example 9 microinches; this height limits the physical reduction of vertical space possible in a Winchester disk drive. Further, each of the functional components of the drive—the storage media, the actuator, read/write header control board, etc. —and the base and cover, which maintain a controlled environment about the storage media, provide further limitations to minimal drive size.

The reduction in size of disk drives involves more than merely reducing the size of the numerous components used therein. In a number of cases, a re-arrangement of the drive architecture is required to achieve the desired form factor. Each re-arrangement of the components in a drive's architecture in itself leads to a new set of problems.

Disk drive manufacturers and computer manufacturers usually establish standards for vibration and shock resistance for hard disk drives. Among the criteria imposed on hard disk drives are vibration resistance, compactness, low weight, low power, and ease of manufacture. All of these criteria are usually important to a computer manufacturer selecting a disk drive for use in a specific computer or for a specific type of application. The standards may be more or less stringent depending on the intended application of the drive, and the level of shock and vibration the drive will be expected to endure. Nonetheless, certain minimum tolerances are required for proper mechanical operation of the drive.

One effect of vibrations applied to a disk drive, and one cause of errors in seeking and/or track following, is mechanical off-tracking, i.e., an unintended physical movement of the heads with respect to the disk(s). Mechanical off-tracking may be caused by movements of various structural components of the disk drive with respect to the disks. Thus, it is important that the Hard Disk Assembly (HDA) maintain strict structural rigidity throughout the performance of the data storage and retrieval.

Conventional disk drives have been fabricated of dense, heavy materials to provide the structural rigidity necessary to prevent thermal gradients and other physical stresses from causing mechanical off-tracking, making it difficult to reduce the size and weight of such disk drives. Further, existing disk drives incorporate a large number of mechanical parts; a large number of components presents problems in satisfying requirements for shock and vibration resistance.

To further increase a particular drive's resistance to physical shock, conventional hard disk drives often incorporate a device for parking the head(s) of the drive. As used in this patent, the terms "park" and "parking" refer to maintaining the position of the read/write heads over a selected, non-data storage portion (usually termed a "landing zone" and located at the inside or outside diameter) of the disk by latching the actuator which supports the heads. Many parking devices park the heads by physically engaging or "latching" the actuator. (The terms "latched" and "unlatched," respectively, refer to the engagement and disengagement of the parking device and the actuator.) It is desirable to park the actuator because physical shocks experienced during shipping or other non-operational movements of a disk drive may cause the head to "slap" against the disk, possibly causing a loss of data if the head slaps against a data-carrying portion of the disk. Parking the head assures that the head will land on the landing zone and will be held in a position over the landing zone during the power down period.

Electromagnetic parking devices require electrical power to release the parking device during operation of the disk drive which reduces the life of the batteries in a portable computer. Purely magnetic parking devices park the actuator by the attraction of and, generally, direct contact between a magnetically permeable portion of the actuator and a magnet. The primary drawback of a magnetic latch of this type is that during operation of the disk drive the rotational movement of the actuator is adversely affected by the attraction of the magnetically permeable portion of the actuator and the magnet, thereby creating problems with the track following and seek functions. Further, an extremely large force is required to release the actuator from the magnet.

Another concern in disk drives is the difficulty in sealing the drive to protect the disks from contaminants. This difficulty arises from the large area which must be sealed to protect the controlled environment where the disk resides and from the large number of points at which access to the controlled environment is provided. These access points are utilized to bring to the interior of the disk drive electrical circuits which provide current to the motor which rotates the disk, transmit data signals to and from heads which read and record information on the disks, and in some instances, provide current to a voice coil for positioning the heads with respect to the disk or disks.

In accessing the information stored on each data track, it is important that the read/write head be accurately positioned by the actuator over each data track. A control mechanism is provided in order to maintain the position of the read/write head within the boundary of each data track and may take the form of detents provided in a stepper motor or by closed loop embedded servo information provided in each sector in voice coil-type actuator drives.

During initial disk fabrication, a typical storage disk will be provided with the plurality of data storage tracks. During drive fabrication, the necessary servo information is written into the data tracks of the storage disk. This process is sometimes referred to as "pack-writing".

Generally, pack-writing is performed before the drive is sealed. Conventionally, this meant that pack-writing took place before the cover portion of the drive was in place. However, this process had the disadvantage of allowing prolonged exposure of the media to contaminants and it was possible that some distortion of the mechanical structure of the drive could take place once the drive cover was secured in place.

One method of overcoming this problem is disclosed in U.S. Pat. No. 4,669,004 issued to Moon et al., wherein one form of pack-writing through the drive cover is disclosed. In Moon et al., an optical scanning system determines sector location and allows write control circuitry to write the servo control information at the beginning of each sector in accordance with the servo control scheme disclosed therein. Holes in the cover allow access to the drive components to allow for optical sector determination and external, mechanical actuator stepping control. Simultaneously, a control system is coupled to the actuator to use the drive's own read/write heads to write the servo information on the disk. Because the system is dependent on the optical determination of sector location by means of the detection of alternating silvered and darkened portions of the disk clamp, it is dependent on the mechanical accuracy of the sector identifiers manufactured into the disk clamp. Thus, an error compensation scheme is required to eliminate such mechanical errors. Further, the drives produced by the Moon et al. system do not show means to provide a hermetic seal suitable to allow the drives to operate at various pressure conditions.

SUMMARY OF THE INVENTION

It is, therefore, an object of the present invention to provide a 3½" form factor disk drive having a storage capacity of at least 500 mbytes.

It is a further object of the present invention to provide a disk drive having enhanced data access capabilities.

A further object of the invention is to provide a disk drive having the above features in a configuration which provides ease in assembly through the use of a flat base plate design.

A further object of the invention is to provide the above objects of the invention in a disk drive having an increased storage capacity and utilizing a multiple platter Winchester technology storage medium.

A further object of the invention is to provide the above objects in a disk drive which allows for the writing of embedded servo information with the cover of the drive in place.

These and other objects of the invention are provided in a hard disk drive architecture presenting a novel arrangement of components in a 3½ inch form factor. The architecture includes a base and a cover for defining a controlled environment, said base and said cover being engaged with a gasket therebetween, said base and cover further having a length of approximately 5.75 inches, a width of approximately 4.00 inches, and an assembled height of less than 1.7 inches. Provided on the base is a storage means comprising a plurality of disks rotatably mounted about an axis passing through the center of said disks, each said disk having a plurality of concentric tracks. A control means for providing control signals directing data storage and data retrieval functions in the disk drive is mounted to the bottom of said base. A spindle motor is also provided on said base for rotating said storage means in response to said control signals. Transducer means, for reading information from and writing information on said storage means in response to said control signals, are provided on an actuator means pivotally mounted about an actuator pivot point on said base plate. The actuator means positions said transducer means in a plane substantially perpendicular to the plane defined by said storage means and provides said transducer means at a height above said storage means of less than 6 microinches. A magnet structure, including a magnetic means for providing magnetic field, and coil means, mounted on said actuator arm and lying in a plane substantially parallel to said disk for passing a current in said magnetic field to position said actuator means, are provided to position the actuator means. In addition, means for coupling said printed circuit board control signals to said actuator means and said means for rotating said storage means are provides as well as parking means for interacting with said actuator means to park said transducer means at a predetermined location on said storage means.

Preferably the base plate is of a "flat" base plate type design and the cover is secured to said base, and first and second support posts provided at the actuator and spindle motor pivot axis. In addition, a shock frame is secured to said cover and includes a first and second sides and a first and second ends, said first and second sides oriented adjacent said base and said control means.

DESCRIPTION OF THE PREFERRED EMBODIMENTS

A disk drive according to the present invention will be described herein with reference to FIGS. 1–7. As discussed more specifically below, the preferred embodiment of the disk drive of the present invention includes six (6) hard disks each having a magnetic coating and utilizing Winchester storage technology; however, it is within contemplation of the present invention to utilize various numbers of disks and other types of disks such as optical disks, and other read/ write technologies such as lasers.

The disk drives of the present invention reflect the continuing trend in the storage technology industry to incorporate a greater amount of data storage into ever-decreasing physical space dimensions, under a maximum of operating temperatures and shock conditions. In one embodiment, the drive incorporates a formatted storage capacity of 500 MBytes into a so-called 3½-inch, "half-height" form factor utilizing six disks. In an alternative embodiment, a four platter disk drive may be provided having a storage capacity of 320 MBytes. The disk drive of the present invention accomplishes these objectives by providing a novel arrangement of traditional disk drive components.

In the disk drives of the present invention, a so-called 3½inch disk having a diameter of approximately 3.75 inches is utilized to provide a disk drive having a length ("l") of 5.75 inches, a width ("W") of 4 inches and an assembled height of less than 1.65 inches, and preferably an assembled height of 1.62 inches. The total weight of the drives is less than two and three-tenths (2.3) pounds. The overall power consumption during the read and write functions is approximately five (5) watts and power consumption may be as low as four (4) watts during idle periods. In particular, the height of the disk drive of the present invention is approximately one-half of that of a full height disk drive in a conventional 5¼" form factor hard disk drive, the length approximately equal to the width of a conventional 5¼" drive, and the width equal to approximately one-half the length of a conventional 5¼" drive, thereby allowing four of the drives of the present invention to occupy the space formerly occupied by a standard-height 5¼" form factor disk drive.

With reference to FIGS. 1–7, disk drive 10 in accordance with the present invention includes base 12 and cover 14 comprised of, for example, aluminum. A gasket 16 is provided between base 12 and cover 14 to establish a sealed (or controlled) environment between base 12 and cover 14. The cover 14 is mounted on base 12 by means of socket head screws 18 provided through bores 18a in cover 14 to screw into threaded mounting holes 19 to attach the cover 14 to base 12. The positioning of bores 18a on cover 14 and the threaded mounting holes 19 on base 12 are such as to enhance the structural rigidity of disk drive 10. The total height ($h_1$ in FIG. 3) of the assembled cover 14 and base 12 is 1.25 inches.

Figure 2:
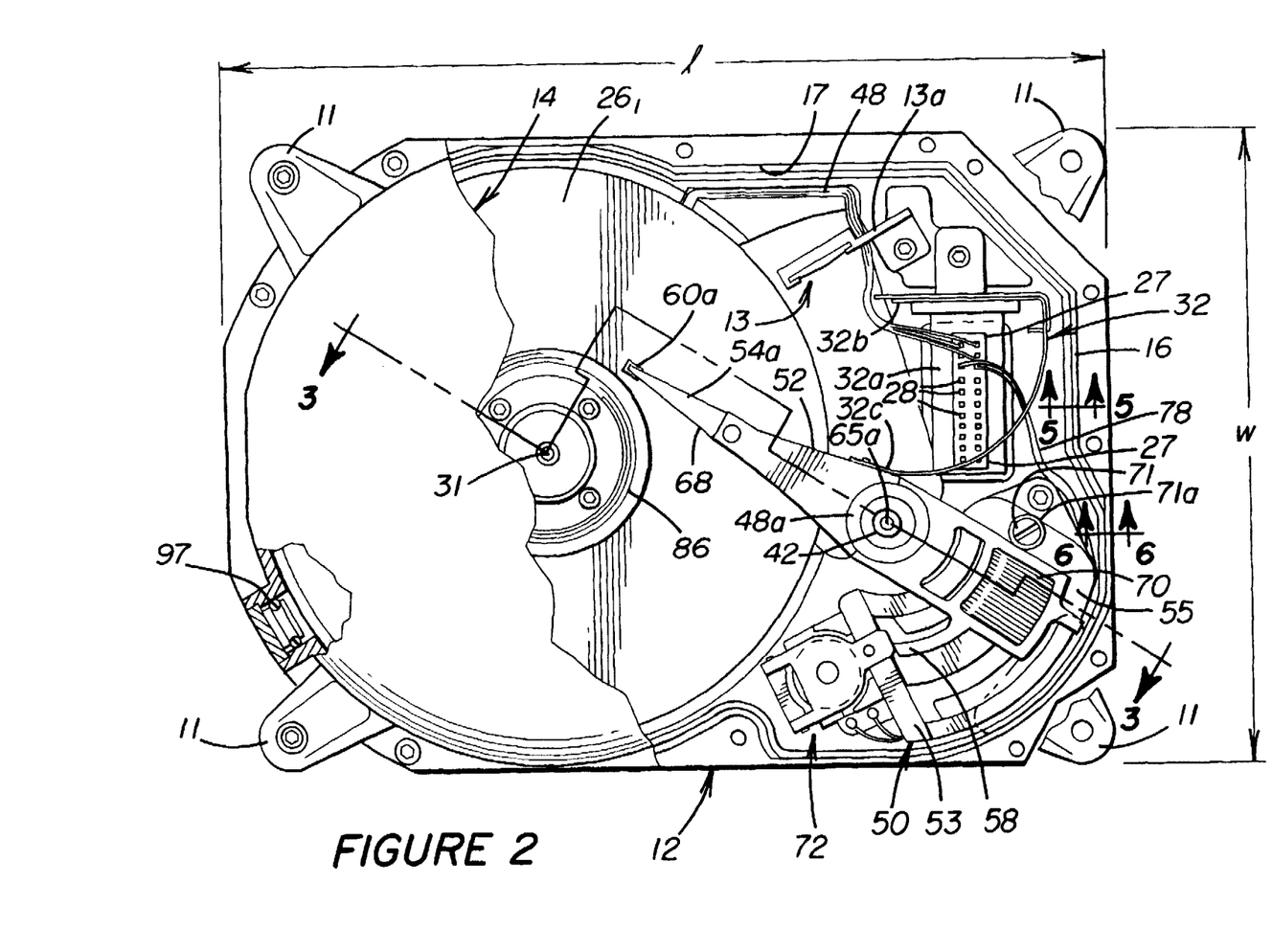
FIG. 2 is a top-level plan view of a disk drive according to the present invention.
Figure 3:
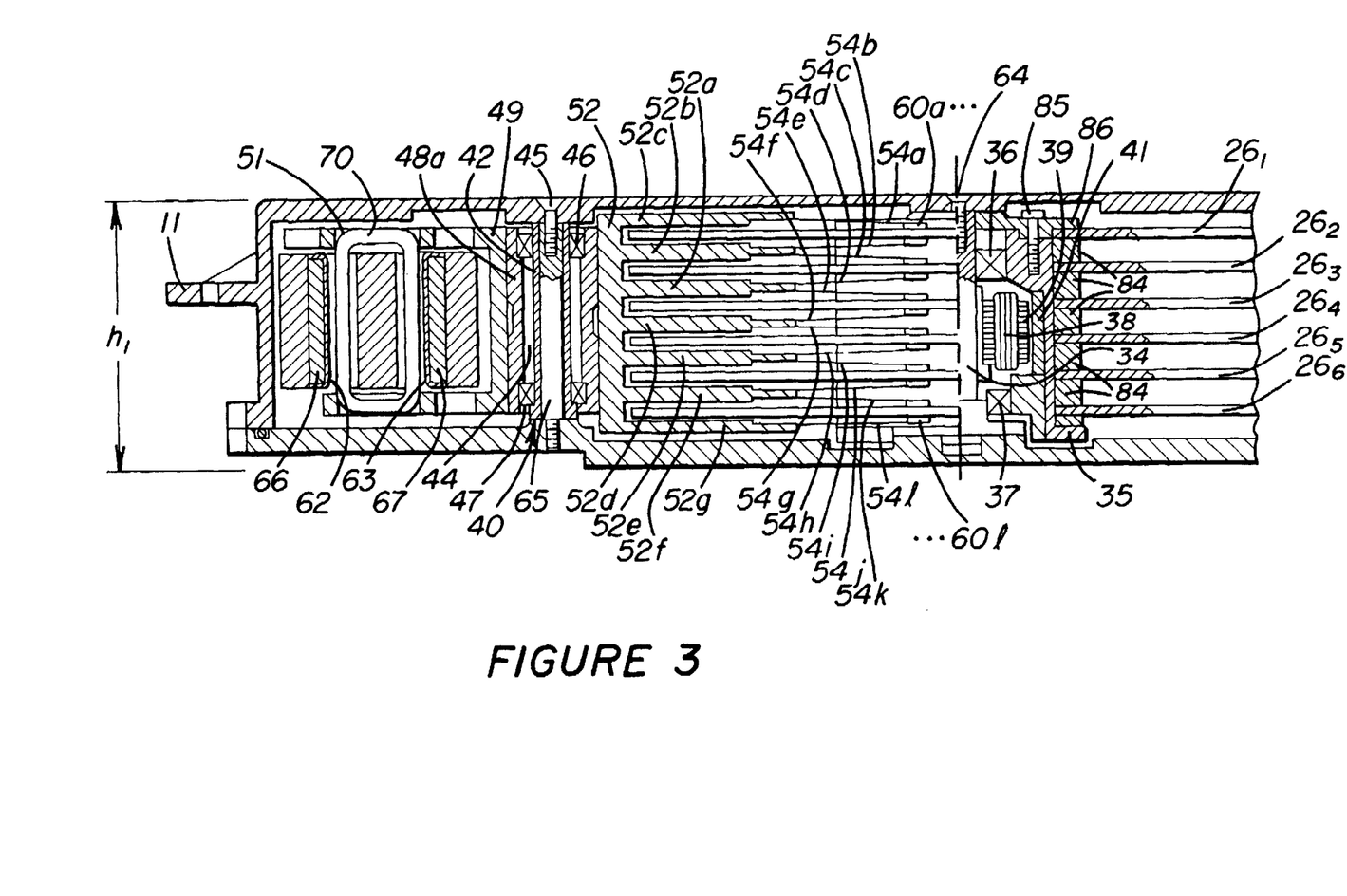
FIG. 3 is a cross-sectional side view along line 3—3 in FIG. 2.

Other features of disk drive 10 include actuator assembly 50, spindle motor 30, and printed circuit board (PCB) 15. PCB 15 contains circuitry for providing control signals necessary for operating disk drive 10. As is shown in FIGS. 2 and 3, disk drive 10 further includes six disks $26_{1-6}$ mounted on spindle motor 30 to provide a means for storing data in the drive.

In general, base 12 is provided with a flat top surface for conveniently mounting the components of the disk drive thereon during the manufacturing process. This type of base significantly increases the speed with which the drives can be manufactured over conventional drives using a base having the so-called "bathtub" design. A base having the bathtub design requires that elements being mounted to the base and the tools used to mount the elements must all fit within the walls of the bathtub, making it difficult to locate an element and later rotate the element into position. Base 12 includes recesses 23 and 24 in which the actuator assembly 50 and disks $26_{1-6}$ are mounted. Base 12 also includes a well region 29 for receiving spindle motor 30. Recesses 23 and 24, and well region 29, contribute to the ability of the drive to incorporate aforementioned drive components in a 6-disk embodiment.

Base 12 is preferably die cast and generally varies in width from between 0.10 and 0.15 inch, (excluding mounting regions 20 and 21) and is as narrow as 0.025 inch in well region 29. As such, the base plate alone is insufficient to provide enough structural rigidity for the drive mechanics to operate properly. As will be understood after a review of the entire specification, a number of mechanical forces within drive 10 act on base plate 12 to provide varying stresses in myriad directions and, absent sufficient structural integrity in drive 10, mechanical off-tracking errors and/or data tracking errors will occur.

To ensure the requisite structural rigidity in a flat base plate design, the disk drive of the present invention employs a novel cover design and mounting arrangement. Cover 14 is preferably cast from aluminum and includes a semi-cylindrical portion 14a and a component portion 14b. Semi-cylindrical portion 14a is designed to surround disks $26_{1-6}$ and contain a large quantity of the air flow generated by the rotation of disks $26_{1-6}$ to improve the efficiency with which suspensions $54_{a-l}$ allow transducers $60_{a-l}$ to fly over disks $26_{1-6}$. Component portion 14b is likewise designed to surround actuator assembly 50 and header assembly 27 mounted therein using a minimum amount of external area. As a result, the width of drive 10 may be kept to a minimum while the contour of cover 14, between portions 14a and 14b, allows for additional mounting screws 18 to be utilized to secure cover 14 to base 12. Further rigidity is provided by cover screws 45 and 64 which mount into threaded bores 45a and 64a of actuator assembly 50 and spindle motor shaft 34, respectively. This support design allows for ease in drive manufacture and assembly by allowing for all drive components to be easily mounted on flat base plate 12.

Structural isolation for drive 10 is provided by shock frame 25. Cover 14 engages shock frame 25 at four points. Frame bushings 25a are interposed between shock frame 25 and cover 14; buttresses 11 extend outwardly from cover 14 to engage bushings 25a. Shock frame bushings 25a are secured to buttresses 11 by hex screws 59. Further, shock frame 25 includes side rails E and F that, when assembled with base plate 12, cover 14 and PCB 15, provides additional lateral support for PCB 15. Base 12 includes a first and second sides C and D, and first and second ends A and B, which align with coils E and F, G and H, respectively. End portions G–H of shock frame 25 allow for easy access to connectors on PCB 15 which couple to control busses in a host computer. When assembled, the total height ($h_2$ in FIG. 1B) of cover 14, base 12, PCB 15, and shock frame 25 is approximately 1.62 inches.

Figure 1A:
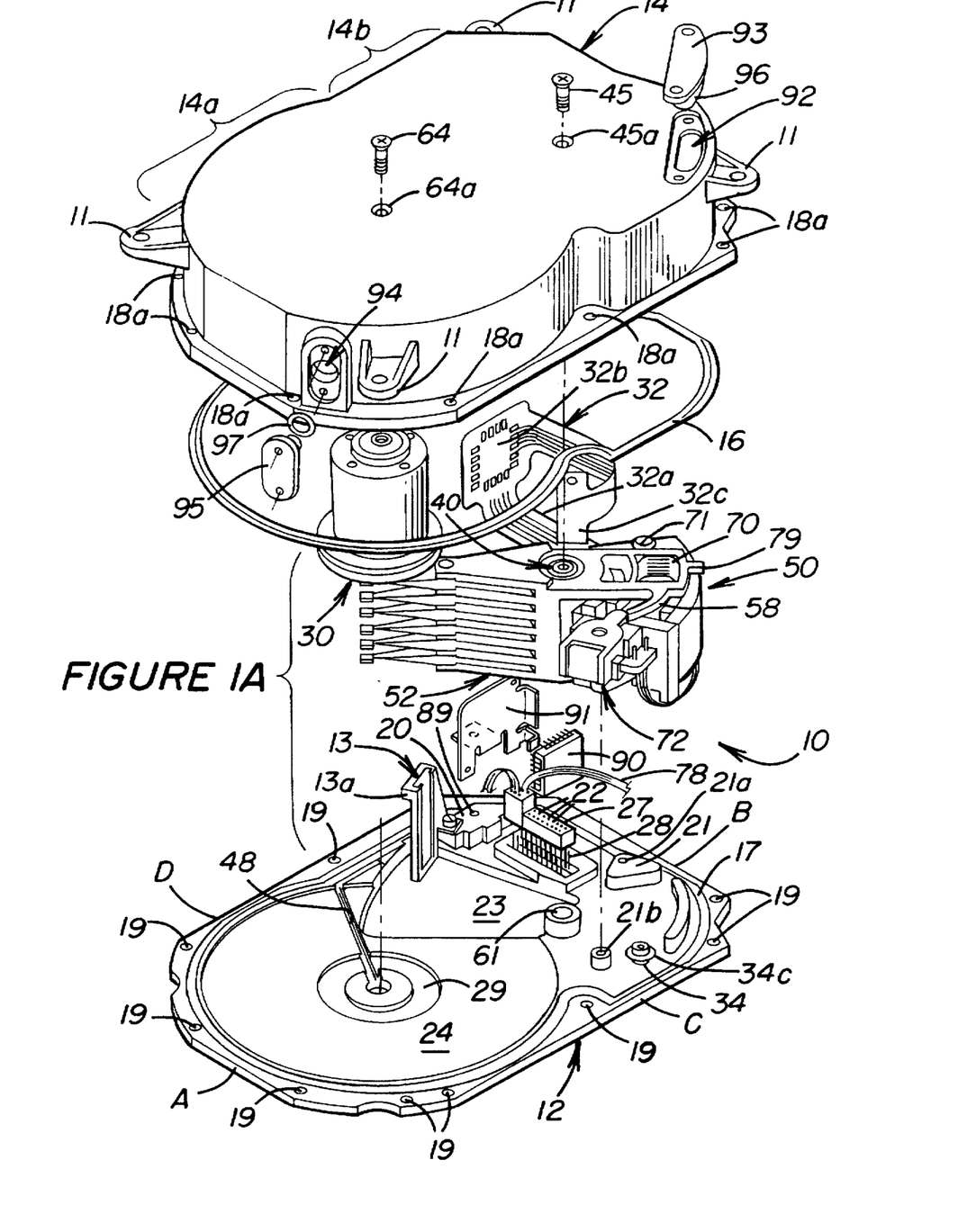
FIG. 1A is an exploded, isometric view of the base, cover, and integral components of a disk drive according to the present invention.
Figure 1B:
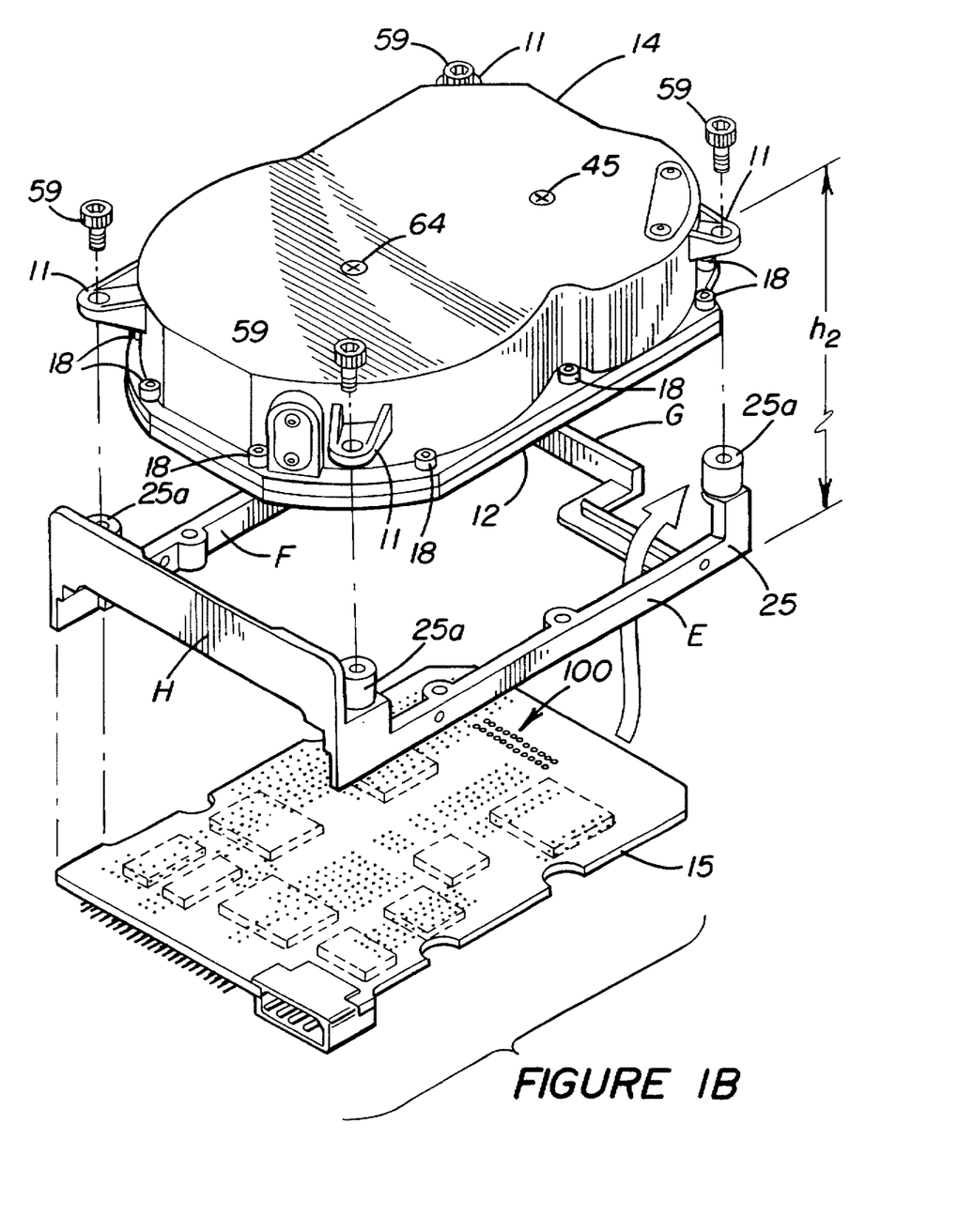
FIG. 1B is an exploded, isometric view of an assembled hard disk drive assembly, shock frame and printed circuit board of a disk drive according to the present invention.

As is shown in FIGS. 1A and 1B, the structure of base 12 and PCB 15 is such that a minimum amount of height is required to provide a mounting area for the plurality of components utilized in drive 10. PCB 15 mounts on the bottom of base 12 in a configuration such that the circuitry provided on PCB 15 does not extend beyond the total height of side rails E and F of shock frame 25. As discussed more completely below, the circuitry provided on PCB 15 creates control signals which control, for example, the operation of the actuator assembly 50 and spindle motor 30 to allow disk drive 10 to selectably access data stored on disks $26_{1-6}$.

Figure 5:
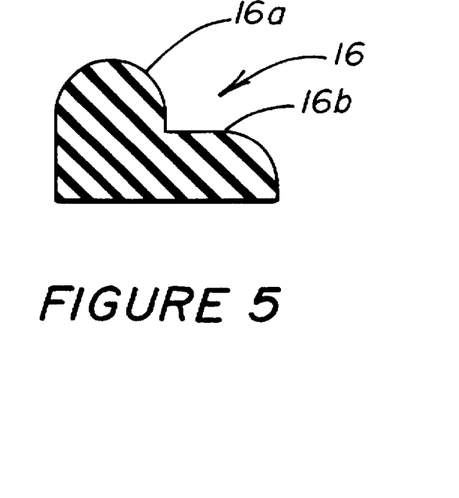
FIG. 5 is a cross-sectional side view along line 5—5 in FIG. 2.
Figure 6:
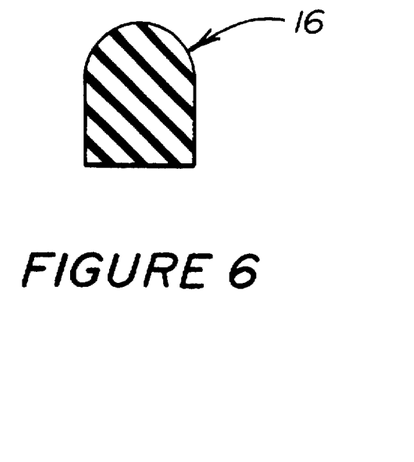
FIG. 6 is a cross-sectional view along line 6—6 in FIG. 2.
Figure 7:
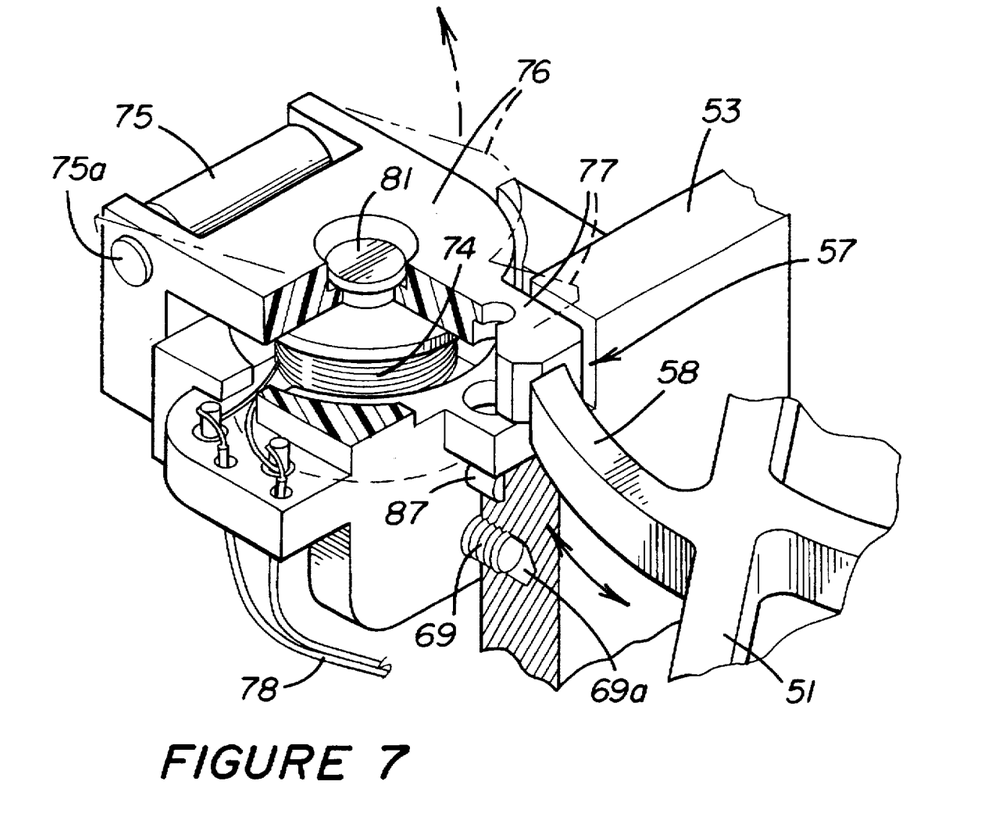
FIG. 7 is an exploded, cutaway view of the latch arm and latch mechanism assembly of a disk drive in accordance with the present invention.

Gasket 16 is of a unique structure in disk drives which allows an improved seal to be formed between base 12 and cover 14 to provide the controlled environment therebetween. Gasket 16 will be described with reference to FIGS. 1, 2, 5 and 6. FIGS. 5 and 6 are partial, cross-sectional views of gasket 16 along lines 5—5 and 6—6 of FIG. 2. As detailed in FIG. 5, a portion of the gasket cross section comprises a wall $16_a$ and lip $16_b$, comprising the majority of gasket 16. Lip $16_b$ abuts the bottom portion of cover 14 and, in conjunction with wall $16_a$, provides a seal when cover 14 is slidably mounted against gasket 16. A trough 17 is formed in base 12 and has substantially the same shape as cover 14 and gasket 16. Gasket 16 is formed to a shape substantially the same as trough 17 and, upon assembly, gasket 16 is seated in trough 17 in a fashion such that wall $16_a$ will rest on the interior of the controlled environment created by base 12 and cover 14. Gasket 16 is formed of a pliable material, preferably 50 Durometer butyl, such that when gasket 16 is sandwiched between cover 14 and base 12, an improved seal is formed between the cover 14 and base 12 to provide a controlled environment for operation of the disk drive.

The assembled base 12, cover 14, and gasket 16 (FIG. 1B) provide a controlled environment which is sealed to 10,000 feet above and 200 feet below sea level. A filter 13 is provided to assist in ensuring a contaminant-free, controlled environment between base 12 and cover 14. Filter 13 is slidably mounted in filter mounting 13a and secured to base 12.

FIG. 2 is a top-level diagram showing the layout of the components in the disk drive 10. Disk $26_1$ is shown rotatably mounted about axis 31 located at the center of disks $26_{1-6}$ and spindle motor 30. Axis 31 is located at a distance of approximately 2.10 inches from end side A and approximately 1.99 inches from side C of base 12. Disk clamp member 86 secures disks $26_{1-6}$ in place on spindle motor 30.

Header assembly 27, having a plurality of holes 22 and a corresponding plurality of pins 28 press-fit into holes 22, transfers control signals from PCB 15 to the controlled environment within base 12 and cover 14. Pins 28 plug directly into a connector 100 provided on PCB 15.

Actuator flex circuit 32 carries electrical signals from header 27 to heads $60_{a-l}$ and actuator assembly 50. Actuator flex circuit 32 is electrically connected to pins 28 under header assembly 27 in a first region 32a. Actuator flex circuit 32 terminates at a point where the actuator flex circuit 32 joins actuator arm assembly 52 at region 32c. Portion 32b of flex circuit 32 is designed to receive control chip 90, which acts in concert with PCB 15 to provide control signals to actuator assembly 50. Chip 90 and flex circuit 32 are secured to base 12 by bracket 91, secured in base 12 by hex screws in threaded bores 89. The radius of the curve defined by the actuator flex circuit 32 defines a torque which is exerted by the actuator flex circuit 32 on the actuator arm assembly 52. It is desirable to minimize the effect the torque exerted by the flex circuit 32 on the actuator arm assembly to thus maximize the force exerted by the voice coil motor whose operation is discussed below.

Actuator flex circuit 32 is generally separated into three portions. A first portion includes two conductions for carrying current to the actuator coil 70. A second portion is a ground plane which separates the first, current-carrying portion from a third, data-carrying portion. The third data-carrying portion includes 24 paired data carrying lines for providing signals to heads $60_{a-l}$ for recording information on disks $26_{1-6}$ and from heads $60_{a-l}$ to PCB 15 via header assembly 27 when reading data from disks $26_{1-6}$.

With reference to FIGS. 2, 3, 4, 8 and 9, the structure and operation of actuator assembly 50 will be hereinafter described. As is discussed in further detail below, actuator assembly 50 positions transducer means $60_{a-l}$, one of which is associated with each surface of each disk $26_{1-6}$, are positioned over individual data tracks lying in the same vertically oriented, cylindrical segment defining the same track on each surface of disks $26_{1-6}$.

Figure 8:
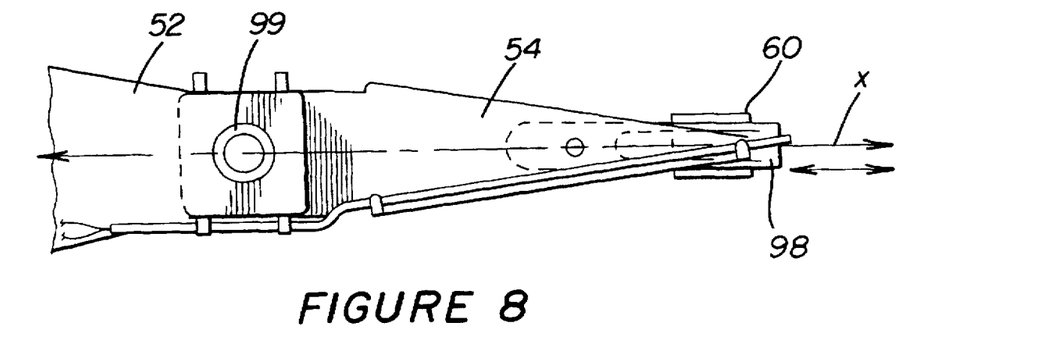
FIG. 8 is a partial plan view of an actuator arm.
Figure 9:
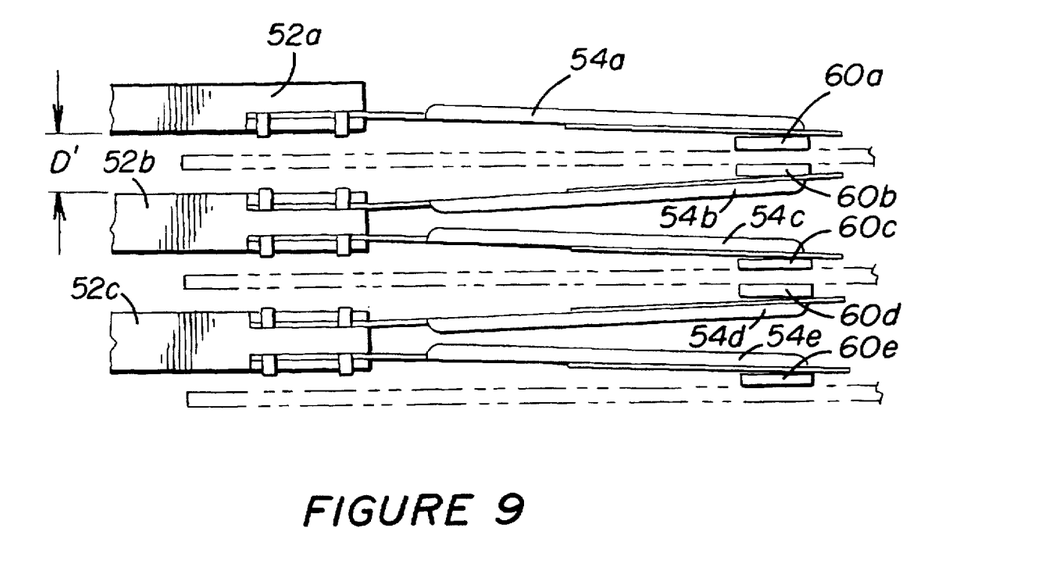
FIG. 9 is a partial side view of a group of actuator arms.

Actuator assembly 50 includes actuator arm assembly 52, suspensions $54_{a-l}$, flexures 98 and read/write heads $60_{a-l}$. Actuator arm assembly 52 also includes a plurality of support arms $52_{a-g}$, mounted at a first end 68 of assembly 50, which support suspensions $54_{a-l}$ each having flexure 98 thereon for mounting read/write heads $60_{a-l}$. Actuator support housing 55 is E-shaped and includes members $52_1$, $52_2$, and $52_3$. Heads $60_{a-l}$ preferably comprise thin-film transducers having a gap width of approximately 9.0 microns. In the preferred embodiment of the invention, suspensions $54_{a-l}$ are mounted to support arms $52_{a-g}$, respectively, by means of a stamped metal post 99 for interlocking each suspension with each respective support arm aligned on line X, as shown in FIG. 8.

Actuator arm assembly 52 is extruded to form a single piece of material, such as magnesium. (Alternatively, assembly 52 may be die cast.) Assembly 52 is slidably mounted on actuator support pin 65 by bearing cartridge 40. A socket head cap screw 45 is provided through cover 14 to actuator support pin 65, as is shown in FIGS. 2 and 3. FIG. 3 details bearing assembly 40 of actuator assembly 50. FIG. 3 specifically shows bearing assembly 40 mounted on actuator sleeve 42 abutting mounting cast 61 of base plate 12. Actuator sleeve 42 is secured to mounting cast 61 of base 12 by means of actuator support pin 65, at one end including threaded screw bore 65a for screw 45. At the opposite end, pin 65 is threaded to engage mounting cast 61. Actuator arm assembly 52 is slidably mounted about outer sleeve 49, which contains actuator bearings 46 and 47, separated by spacer 44. Housing 48a, pin 65 and spacer 44 may be manufactured from, for example, stainless steel. Actuator arm assembly 52 is preferably manufactured from magnesium to reduce the weight and resultant inertia of actuator assembly 50.

With reference to FIGS. 2, 3, and 5, the force necessary to pivot actuator arm assembly 52, suspensions $54_{a-l}$, and read/write heads $60_{a-l}$, to position read/write heads $60_{a-l}$ at specific tracks is generated by a voice coil motor including coil 70 and actuator magnets 66, 67. Actuator magnets 66,67 are preferably adhesively attached to actuator support housing 55 and thereafter sealed with magnet shields 62,63, respectively, which ensure the integrity of the controlled environment between base 12 and cover 14 should magnets 66,67 decompose over the life of the drive. Actuator support housing 55 and housing plate 53 are formed of a magnetically permeable material to provide returns for the magnetic field generated by magnets 66 and 67. Magnets 66 and 67, and actuator coil 70, are arranged so that coil 70 is placed in the magnetic field created by magnets 66 and 67. Coil 70 may be formed from 450 inches of 32 Awg RSTSL copper wire. yielding a 300 turn coil about the end 51 of actuator arm assembly 52. End plate 53 is maintained abutting support housing 55 purely through the magnetic return force provided by magnets 66 and 67. Actuator support housing 55 is secured to base 12 by threaded hex screws passed through via hole 56a, threaded into hole 21a of mounting cast 21 on base 12 and via hole 56b into threaded hole 21b on base 12.

Actuator magnets 66 and 67 are preferably single piece, bipolar magnets, preferably comprised of neodymium iron boron. Magnets 66 and 67 provide first and second magnetic fields $\vec{B}_1$ and $\vec{B}_2$ between respective poles of magnets 66 and 67. Magnetic fields $\vec{B}_1$ and $\vec{B}_2$ are encompassed in a closed magnetic circuit including various portions of support housing 55 and end plate 53. By containing the magnetic fields in the returns provided by plates 55 and 53, the magnetic field intensity of each field is increased in the region between the respective poles of the magnets. The strength of the magnetic field in this region is directly related to the torque which the voice coil exerts on actuator arm assembly 52, and thus the rotational (angular) velocity of actuator arm assembly 52 and the seek times for the drive. Placing coil 70 between members $52_1$ and $52_3$, holding magnets 66 and 67, and around arm $52_2$, reduces the gap between magnets 66 and 67, thereby decreasing flux leakage and increasing the strength of the respective magnetic fields.

Thus, currents passing in opposite directions in coil 70 create torques in opposite directions to magnetic fields $\vec{B}_1$ and $\vec{B}_2$ so that actuator arm assembly 52 and the components mounted thereon may be pivoted to position heads at selected locations between inside and outside diameters of the data region on the disks $26_{1-6}$.

In operation, control signals are provided to the coil 70 via actuator flex circuit 32 (FIG. 2) to selectively control the actuator assembly 50 to position heads $60_{a-l}$ at specific individual data tracks on disk $26_{1-6}$. In the preferred embodiment of the invention, each disk $26_{1-6}$ comprises a two-sided platter having a total of 1806 tracks, yielding formatted capacity of 510 Mbytes. Sputtered 1400 Oe disks for use in the disk drive of the present invention are currently available from Komag, Inc. 275 South Hillview Drive, Milpitas, Calif. 95035.

Tables 1 and 2 below specify certain characteristics of disks $26_{1-6}$.

TABLE 1

| Number Data Cylinders/Disk | 1806 cylinders |
| --- | --- |
| Sectors per Track | 47 sectors |
| Number of Disks | 6 |
| Number of Data Surfaces | 12 |
| Bytes per Sector | 667 bytes |
| Data Bytes per Sector | 512 bytes |
| Total Data Capacity | 510.4 Mbytes (user formatted) |
| | 679.4 Mbytes (unformatted) |

TABLE 2

| Disk Diameter | 3.75 inches |
| --- | --- |
| Data Track Width | .476 microinches |
| Track Density | 2150 tracks/inch |
| Bit Density (max) | 27,777 Flux changes/inch |
| Head Width | 9.0 microns |
| Outermost Track Radius | 1.785 inches |
| Innermost Track Radius | 0.958 inch |

Also provided on actuator assembly 50 is a latch mechanism for securing actuator arm assembly 52 in response to signals from the PCB 15 directing a "parking" of the drive, typically used whenever power is off and during transportation of the disk drive. The latch means will be described with reference to FIGS. 4 and 5. The latch means includes latch arm 58 mounted parallel with respect to the longitudinal actuator support arms 52a–g. Latch assembly 72 includes solenoid 74 mounted in housing 75 and latch plate 76 pivotally mounted on a hinge portion of housing 75 by pin 75a. Latch plate 76 includes a tab 77 for engaging latch arm 58 to park actuator assembly 50 with transducers $60_{a-t}$ over the respective landing zones of disks $26_{1-6}$. Latch assembly 72 is secured to housing 53 by means of socket head screw 69 provided through a bore (not shown) in housing 75 into threaded bore 69a in plate 53. Tab 87 molded into housing 75 engages bore 87a to provide sufficient stability for latch assembly 72.

During normal operation of drive 10, a current is supplied to latch solenoid 74 via latch flex circuit 78 which maintains solenoid magnet 81 within solenoid 74 and latch plate 76 flush with the top of plate 53 with tab 77 resting in notch 57 in plate 53. This allows latch arm 58 to pass freely over latch plate 76 and thus actuator assembly 50 to freely position heads $60_{a-t}$ over disks $26_{1-6}$.

To latch actuator 50, control signals are provided from PCB 15 to park the disk drive heads and actuator assembly 50 is driven in the manner described above to position heads 60 at the innermost diameter of disks $26_{1-6}$. As actuator assembly 50 rotates heads $60_{a-t}$, current is removed from solenoid 74 and a spring 102, mounted in bore 103, forces solenoid magnet 81 and latch plate 76 upward, with tab 77 thereafter prohibiting movement of actuator 50 by abutting latch arm 58 and securing arm assembly 52 at the innermost diameter location of disks $26_{1-6}$.

Actuator assembly 50 provides average data seek times of less than about 12 milliseconds, due to the high power-to-mass ratio of the voice coil motor and arm assembly 52, and the small moment of inertia of actuator arm assembly 52.

Figure 4:
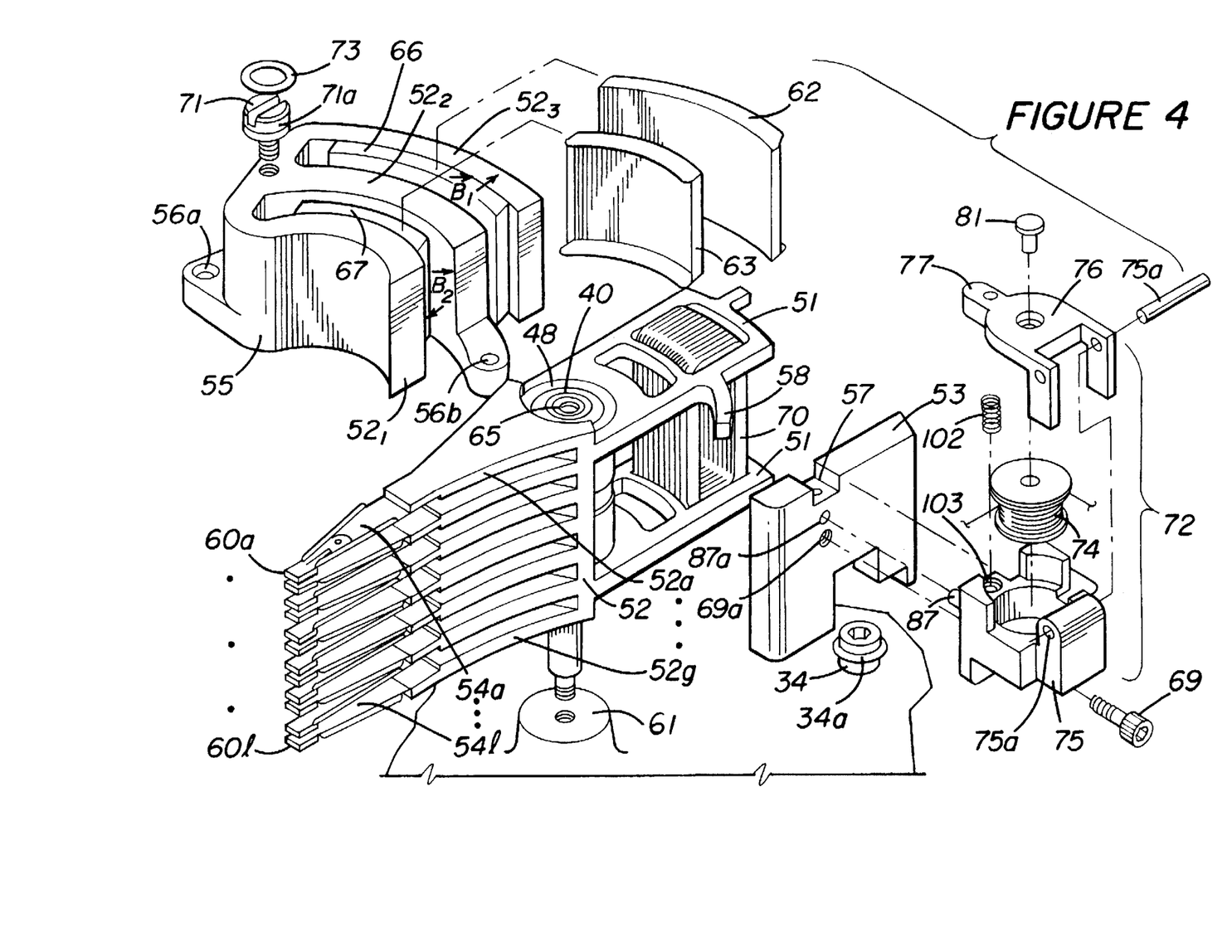
FIG. 4 is an exploded view of the actuator mounting assembly and latch mechanism assembly.

An inside diameter crash stop for the actuator arm assembly 52 is provided by means of a threaded screw 71 having rubber O-ring 73 mounted in groove $71_a$ for engaging second end 51 of actuator arm assembly 52 when heads $60_{a-t}$ are positioned at the inside diameter landing zone of disks $26_{1-6}$; preferably, this inner crash stop is defined at a track radius of 0.90 inch from axis 31. Also shown in FIGS. 2 and 4 is a support post 34 having an O-ring 34a thereabout serving as an outside diameter crash stop. The outside diameter crash stop 34 inhibits movement of the actuator arm assembly 52 past an outer-most track on the disks, preferably at a track radius of about 1.80 inches from axis 31.

FIG. 3 is a sectional view along line 3—3 in FIG. 2 of the hard disk drive of the present invention. FIG. 3 details the assembly of spin motor 30 in which a stator assembly 38 including stator lamination 39 is mounted within hub 35. Hub 35 supports disks $26_{1-6}$ and rotor 41. The design of spindle motor 30 to be contained within hub 35 and mounted in the recess 29 of base 12 provides a highly efficient use of both horizontal and vertical space within drive 10. First and second bearings 36 and 37 rotatably mount shaft 34 in hub 35. Rotor 41 is mounted on housing 43 within hub 35 and may comprise a multi-pole ring magnet.

Spin motor 30 induces a disk rotation speed of approximately 3,828 rpm in response to control signals provided by PCB 15 via flex cable 48. Rotational control signals, as discussed above, are generated by PCB 15 and provided by spin motor flex circuit 48 in conjunction with positioning signals for actuator assembly 50 to enable specific data retrieval.

Hub 35 supports disks $26_{1-6}$ and surrounds spindle motor 30 as discussed above. Spacers 84 are provided to separate disks $26_{1-6}$ by a distance (D in FIG. 9) of 0.140 inch. Disks $26_{1-6}$ are secured about hub 35 by means of disk clamp 86, secured to hub 35 by socket head screws 85 threaded into hub 35.

Spin motor flex circuit 48 is coupled to header assembly 27 for providing control signals from PCB 15 to spindle motor 30 to rotate disks $26_{1-6}$. Spin motor flex circuit 48 is divided into 3 portions, two current carrying portions and a ground portion separating the two current carrying portions.

FIG. 3 also shows the relationship of the read/write heads $60_{a-t}$ to the disks $26_{1-6}$. Heads $60_{a-t}$ are supported by actuator assembly 50 which allows the heads $60_{a-t}$ to "fly" over the surfaces of the disks $26_{1-6}$ on the air currents created by rotation of the disks $26_{1-6}$. Suspensions $54_{a-t}$ provide a gimballing action which allows heads $60_{a-t}$ to fly flat, thereby orienting the surface of each head $60_{a-t}$ facing each respective disk $26_{1-6}$ so that it is parallel to the surface of the disk while the disk is rotating and each suspension $54_{a-t}$ is under load. In the preferred embodiment, heads 60 fly at a height of approximately 5.0 microinches over the disk. Each head 60 represents a load of approximately 5 grams on each suspension 54. This small flying height is necessary to achieve the desired form factor utilizing a 6-disk, high capacity drive.

Disk drive 10 also provides for improved writing of embedded servo information on disks $26_{1-6}$. Cover 14 includes two ports 92,94 to allow embedded servo information to be written onto disks $26_{1-6}$ while cover 14 is secured to base 12. The provision for through the cover writing of embedded servo information in a disk drive results in reduced mechanical off-tracking errors that may result from torquing of the drive mechanics subsequent to writing of the servo information with the cover off. Such off-tracking can be a more significant problem in drives utilizing a flat-base plate design because of the inherent lack of structural rigidity in such a base plate.

In the preferred servo writing process of the present invention, a step member (not shown) is inserted through port 92 to engage tab 79 on actuator assembly 50. Port 94 allows a clock read/write head, mounted on a transport arm, to access one of disks $26_{1-6}$ to determine the speed of rotation of disks 26 during the writing process. To pack-write the drive, a control system is linked to header assembly 27 via pins 28. The pack-write control system provides write control signals to heads $60_{a-t}$ to utilize actuator assembly 50 to write the servo information on disks $26_{1-6}$. In addition, the control system provides current to actuator means 50 to provide a reverse bias against the step member engaged with tab 79. The pack-write control system also provides current to spindle motor 30 to rotate disks $26_{1-6}$ during the writing process.

The clock read/write head initially writes a clock track outside the usable data field of disks $26_{1-6}$, preferably at the outermost diameter track of the disks. As disks $26_{1-6}$ are rotated, the clock head continuously reads the clock track to determine the precise rotational velocity of disks $26_{1-6}$. The pack-write control system determines the precise number of sectors to be utilized per track and directs actuator means 50 to write servo information to each sector in accordance with the desired servo control scheme.

The step member, also under control of the pack write control system, controls movement of actuator means 50 at the desired rate to provide the servo information on each track as desired. Operation of the stepper member and the write process may be coordinated on any number of direct formats to utilize any number of closed-loop schemes.

Ports 92 and 94 are hermetically sealed by covers 93 and 95, respectively. Cover 93 is provided with O-ring 96, and cover 95 with O-ring 97, which ensure the integrity of the controlled environment within the atmospheric conditions specified herein.

The many features and advantages of the disk drive of the present invention will be apparent to those skilled in the art from the description of the preferred embodiments and the drawings. The disk drive described herein provides a high-speed, low-power, compact disk drive suitable for use in portable computers. The drive utilizes an average of 6 watts during seek functions and 5 watts when reading or writing information, and has a data average access time less than about 12 ms. Numerous variations are possible as will be apparent to those skilled in the art; such variations are intended to be within the scope of the invention as defined by this specification and the following claims are intended to cover all the modifications and equivalents falling within the scope of the invention.

What is claimed is:

1. A high performance disk drive, comprising:

a base having a top and a bottom;

at least six magnetic storage disks, each disk having first and second opposing side surfaces, said disks supported on said top of said base;

a plurality of read/write heads, each of said heads being associated with a respective one of said opposing side surfaces of said disks;

an actuator supported on said base for rotation about an axis, the actuator supporting each of said plurality of read/write heads so that each of said plurality of heads faces each respective one of said opposing side surfaces of said disks and said plurality of heads are aligned such that all of said heads define a single line, the line being oriented perpendicular to a plane defined by one of said six magnetic storage disks, the actuator responsive to control signals for selectively positioning said heads with respect to said disks, the actuator further including a tab positioned opposite said heads with respect to the axis;

a cover sealably attached to said base to enclose said disks, said heads, and said actuator for providing a controlled environment therebetween and for providing structural rigidity in the drive, the cover including a first port oriented adjacent to said disks to allow a head to be inserted through said first port to access one of said side surfaces, a first port cover to cover said first port, a second port oriented adjacent to said tab on said actuator, and a second port cover to cover said second port;

latching means for selectively latching the actuator, comprising:

a latch arm mounted at an end of said actuator in a plane parallel to said base;

a latch member mounted adjacent to said latch arm and movable between an actuator unlatching position in which said latch member lies in a plane parallel to and below said latch arm, and an actuator latching position wherein said latch member enters the plane of said latch arm and is adjacent thereto; and solenoid means for moving a central solenoid magnet thereof in an unlatching direction to move said latch member into said unlatching position when current is supplied to said solenoid means, said solenoid magnet being biased in a latching direction to force said latch member into said latching position, said solenoid means being mounted adjacent said actuator; and control means, mounted adjacent to said bottom of said base, for generating said control signals to control said actuator, for controlling said current in said solenoid means, and for providing information signals to and receiving information signals from said heads, wherein said base, said cover, and said control means have a total assembled length of about 5.75", width of about 4.00", and height of about 1.62".

2. The disk drive as claimed in claim 1, wherein said magnetic storage disks are mounted about a hub structure, said hub structure having an interior and an exterior, said exterior supporting said disks, said interior of said hub structure including means for rotating said magnetic storage disks and said hub structure, said hub structure and said means for rotating being mounted about a first support post extending upwardly from said base.

3. The disk drive as claimed in claim 2, wherein said means for rotating comprises a spindle motor for selectively rotating said disks responsive to said control signals, and said control means comprises a printed circuit board mounted on said bottom of said base.

4. The disk drive as claimed in claim 2, wherein each of said first and second opposing side surfaces of said disks is coated with magnetic material having a magnetic intensity of approximately 1400 oerstead.

5. The disk drive as claimed in claim 4, wherein said disks are separated by spacer members, and each of said opposing side surfaces of each of said disks has about 1806 data tracks.

6. The disk drive as claimed in claim 5, wherein said space members provide approximately 0.140" of distance between each of said disks.

7. The disk drive as claimed in claim 5, wherein each of said read/write heads comprises an electromagnetic transducer and is mounted via a suspension and flexure to said actuator.

8. The disk drive as claimed in claim 2, wherein said actuator includes:

an actuator body having first and second ends, said actuator body being mounted about a second support post and coupled to an actuator motor, said actuator motor being coupled to said control means; and suspension means, coupled to said first end of said actuator body, for mounting said plurality of read/write heads and for providing said read/write heads at a predetermined distance above said disks.

9. The disk drive as claimed in claim 8, wherein said actuator body is extruded of magnesium.

10. The disk drive as claimed in claim 8, wherein said actuator motor comprises:

magnetic means, mounted perpendicular to said base and having an arcuate shape, for providing a magnetic field, and a coil, supported by said second end of said actuator body, for passing a current in the region of said magnetic field and under the control of said control means to move said actuator body to position said heads.

11. The disk drive as claimed in claim 8, wherein said base comprises a mounting surface for said disks, said actuator, said control means, and said cover; said cover is secured to said top of said base; and said cover is secured to said first and second support posts.

12. The disk drive as claimed in claim 11, further including a shock frame mounted to said cover.

13. The disk drive as claimed in claim 1, wherein said drive further includes means for electrically interconnecting said control means, said read/write heads, and said actuator, comprising:

a header for providing electrical interconnections between said control means and the controlled environment between said cover and said base, and a flex circuit having first, second, and third portions, said first portion for electrically interconnecting said header and said read/write heads, and said second portion for electrically interconnecting said header and said actuator, and said third portion comprising a ground plane separating said first and second portions of said flex circuit.

14. The disk drive as claimed in claim 1, wherein said first port cover and said second port cover include first and second O-rings, respectively, and are secured over said first port and said second port by fasteners, such that the port covers are sufficient to secure said controlled environment at an atmospheric pressure of 10,000 ft. above and 200 ft. below sea level.

15. The disk drive as claimed in claim 1, further including a gasket provided between said base and said cover for providing a seal therebetween when said base and said cover are attached, wherein said base includes a trench characterized as having a shape substantially the same as said cover, wherein said gasket is characterized as having a shape substantially the same as said cover and a rectangular cross section, said gasket further having a rib characterized as having a shape substantially the same as said cover for abutting an inner surface of said cover.

16. The disk drive as claimed in claim 15, wherein said cover, said gaskets, and said base maintain said length, said width, and said height under operating conditions in the temperature range of 5° C.–55° C.

17. The disk drive as claimed in claim 1, wherein the weight of the drive is about 2.3 pounds.

18. A hard disk drive, comprising:

a base having a length of approximately 5.75 inches and a width of approximately 4.00 inches, and first and second surfaces, said first and second surfaces being generally planar in shape;

a printed circuit board mounted on said first surface of said base and having control means mounted thereon for providing control signals;

storage means comprising six disks, each disk having opposing side surfaces and being rotatably mounted on said base, each said disk having a plurality of concentric tracks;

a spindle motor, mounted about a spindle motor support post, for rotating said storage means in response to said control signals;

a plurality of read/write heads for reading information from and writing information on said storage means;

actuator means pivotally mounted about an axis on said base, said actuator means having a first end for mounting said read/write heads such that each of said plurality of heads faces each respective one of said opposing side surfaces of said disks and all of said plurality of heads lie in a single vertical line oriented perpendicular to a plane defined by any one of said six disks, for positioning said heads at a plurality of positions about said storage means, the actuator means further including a tab positioned opposite said heads with respect to said axis;

an actuator motor including a magnetic means for providing a magnetic field and coil means mounted on said actuator means for passing a current in the direction of said magnetic field;

latching means positioned adjacent to the actuator means, for selectively latching the actuator means, including:
a latch arm mounted at a second end of said actuator means in a plane parallel to said base;
a latch member mounted adjacent said latch arm and movable between an actuator means unlatching position in which said latch member lies in a plane parallel to and below said latch arm, and an actuator means latching position wherein said latch member enters the plane of said latch arm and is adjacent thereto; and
solenoid means for moving a central solenoid magnet thereof in an unlatching direction to move said latch member into said unlatching position when current is supplied to said solenoid means, said solenoid magnet being biased in a latching direction to force said latch member into said latching position, said solenoid means being mounted adjacent said magnetic means; and means for coupling said printed circuit board control signals to the heads, said actuator means, said spindle motor, and said parking means; and a cover sealably attached to said base to enclose said disks, said heads, and said actuator for providing a controlled environment therebetween and for providing structural rigidity in the drive, the cover including a first port oriented adjacent said storage means, a first port cover to cover said first port, a second port oriented adjacent said tab on said actuator, and a second port cover to cover said second port;

a gasket interposed between said cover and said second surface of said base for securing a seal therebetween;

wherein the total height of the base, the cover, and the printed circuit board is approximately 1.62".

19. The disk drive as claimed in claim 18, wherein said actuator means includes:

an actuator body having first and second ends, said actuator body being mounted about an actuator support post, suspension means, coupled to said first end of said actuator body, for mounting said heads, and further wherein: said coil means and said heads are coupled to said printed circuit board, the magnetic means is mounted perpendicular to said base and has an arcuate shape, and the coil means is supported by said second end of said actuator body and a current is passed in the coil means in the region of said magnetic field under the control of said control means to move said actuator body to position said heads.

20. The disk drive as claimed in claim 19, wherein said cover is secured to said actuator support post and said spindle motor support post.

21. The disk drive as claimed in claim 18, wherein each of said opposing side surfaces of said disks is coated with magnetic material plated to have a magnetic intensity of approximately 1400 Oe.

22. The disk drive as claimed in claim 21, wherein said disk drive includes a plurality of spacer elements, each respective one of said spacer elements separating each respective adjacent pair of said disks to provide a distance therebetween of approximately 0.140 inch.

23. The disk drive as claimed in claim 18, further including means for supporting said disk drive, said means for supporting comprising a frame structure surrounding said disk drive and secured to said cover, said frame structure having first and second side rails and first and second ends, said first and second side rails abutting said base and being of a height sufficient to extend below said printed circuit board.

* * * * *